Figure 1:
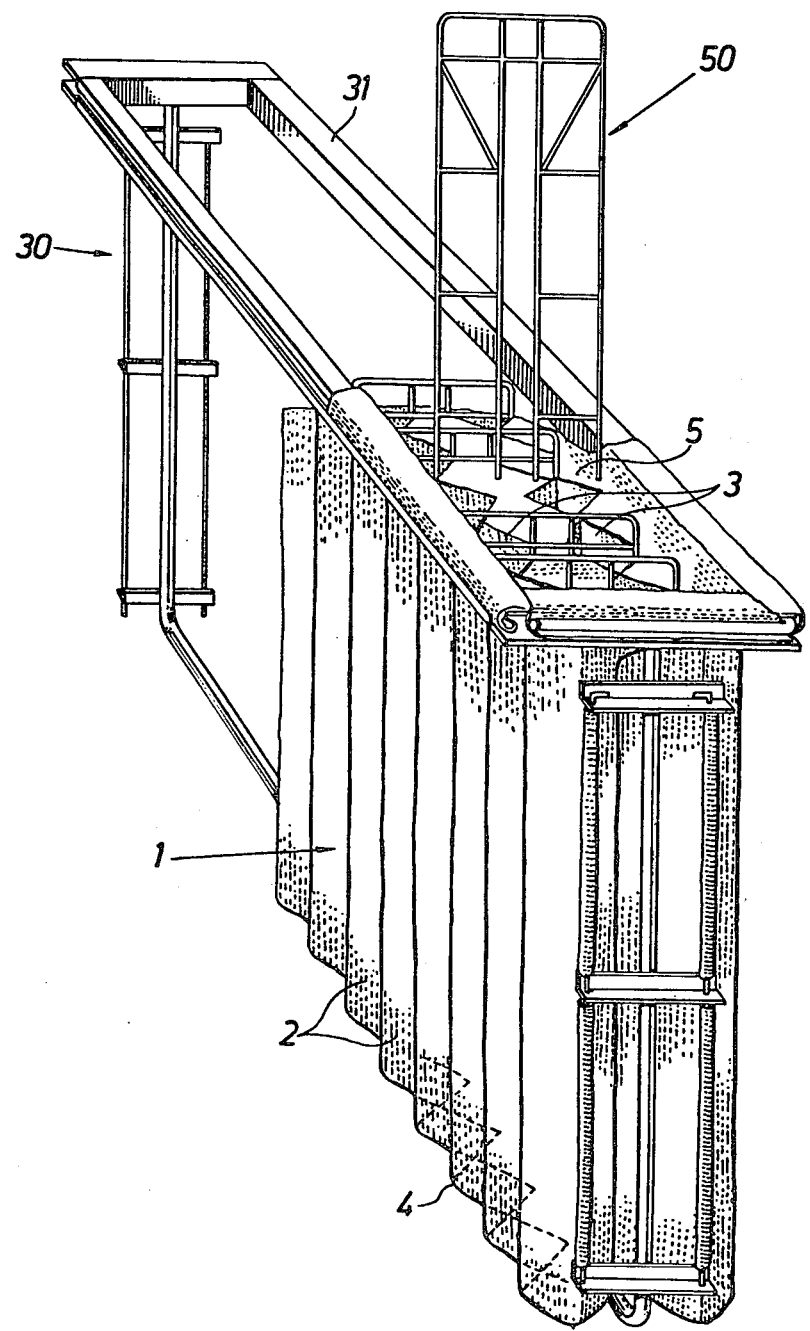

United States Patent [19]

Berglund

[11] 4,141,704
[45] Feb. 27, 1979

[54] DEVICE FOR CLAMPING A CASSETTE FILTER IN A FILTER HOUSING

[75] Inventor: Svante O. Berglund, Hovmantorp, Sweden

[73] Assignee: Aktiebolaget Svenska Flaktfabriken, Nacka, Sweden

[21] Appl. No.: 866,994

[22] Filed: Jan. 5, 1978

[30] Foreign Application Priority Data

Jan. 5, 1977 [SE] Sweden ............................. 7700091

[51] Int. Cl.² ............................................ B01D 46/02
[52] U.S. Cl. ......................................... 55/379; 55/483; 55/493; 55/502; 55/504
[58] Field of Search .................. 55/378, 379, 483, 490, 55/493, 500, 504, 502

[56] References Cited

U.S. PATENT DOCUMENTS

| 3,393,498 | 7/1968 | Schoen ................................. 55/493 |
| 3,698,161 | 10/1972 | Brixius et al. .......................... 55/493 |

FOREIGN PATENT DOCUMENTS 2424340  1/1975  Fed. Rep. of Germany ............. 55/378

Primary Examiner—Bernard Nozick
Attorney, Agent, or Firm—Dann, Dorfman, Herrell and Skillman

[57] ABSTRACT

A device for clamping a filter cassette in a filter housing. The filter cassette comprises a frame which releasably mounts a sleeve-type filter element having a common clean-gas opening at the top. The filter cassette slides into the filter housing to underlie a connecting frame and the clamping means operates to press the filter cassette upwardly against the clamping frame. The clamping member includes a pivoted actuator operable, when pivoted, to longitudinally displace rods on the opposite sides of the filter cassette. The rods have a V-shape recess which cooperates with support members so that when the rods are displaced longitudinally the support members rise out of the recess and elevate the rods to effect clamping of the filter element in place.

2 Claims, 9 Drawing Figures

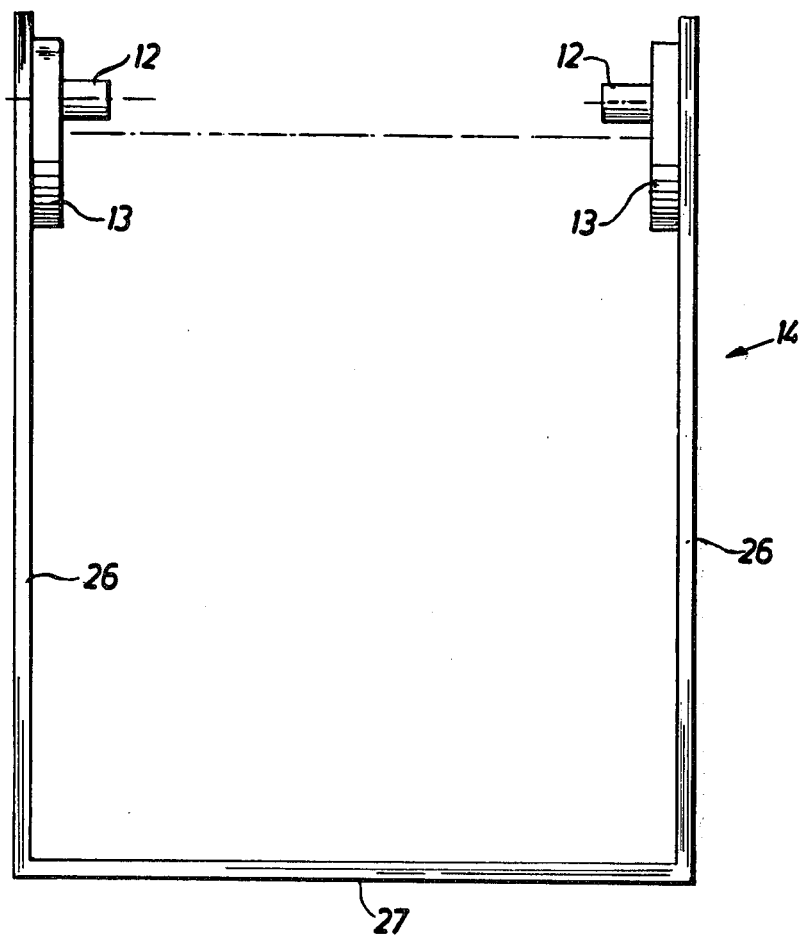

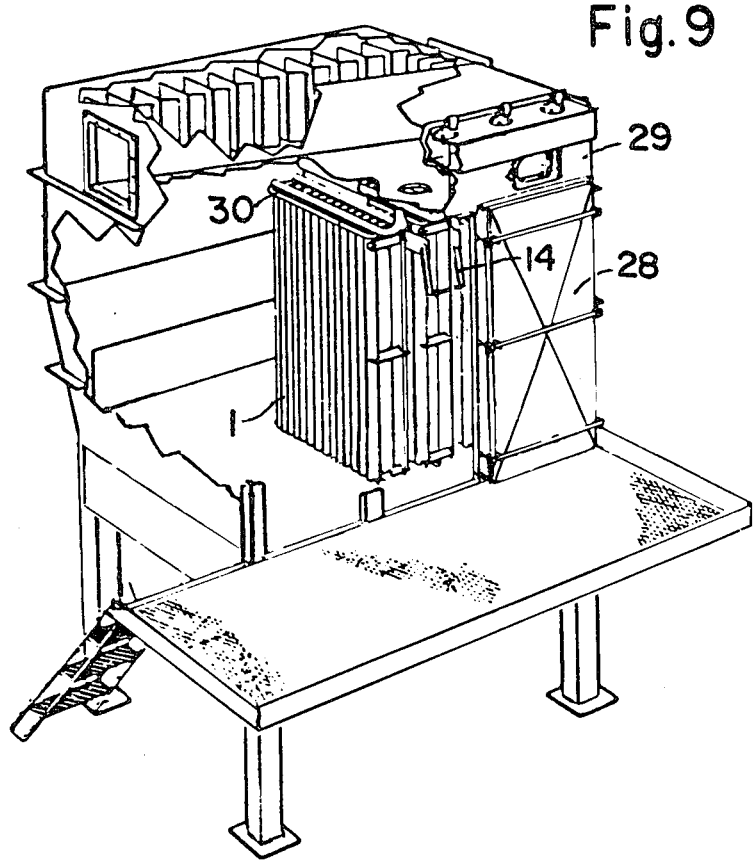

DEVICE FOR CLAMPING A CASSETTE FILTER IN A FILTER HOUSING

This invention relates to a device for clamping a cassette filter in a filter housing. Filter arrangements of this type are used for cleaning gases from dust. The filter is clamped in its cassette, which is inserted into a filter housing. The gas mixed with dust is introduced into a raw-gas chamber and passes the filter material, whereby the dust precipitates on the surface of the filter material. The cleaned gas leaves the filter housing via a clean-gas chamber, which can be common to several cassette filters. Between the cassette frame and the filter housing an effective sealing is required to ensure that all gas on its path from the raw-gas chamber to the clean-gas chamber passes through the filter material. In order to obtain efficient operation of the filter, the dust accumulated on the filter material must be removed therefrom at regular intervals. According to known art, this is carried out by cleaning, possibly in such a manner that the filter material is subjected to shaking movements usually brought about by pressure pulses of a suitable gas, normally air. The filter material during operation is exposed to wear, which varies depending on the gas load, dust concentration and type, and on the cleaning process. In order to ensure safe operation of the filter, the filter material must be inspected regularly and, if necessary, be exchanged. It is, therefore, very important that the inspection can take place in an easy manner, and the filter sleeves or cells can be exchanged simply and rapidly, so that the filter section in question must not be shut-off for a long period. It is essential in this connection that the cassette filter readily can be released from its clamped position and be re-positioned, or a new filter be mounted, and that an effective sealing is obtained between the clean-gas chamber and the filter housing in general.

Several devices for clamping a cassette filter in a filter housing are previously known. The Swedish patent specification 7307987-3, for example, describes a locking device comprising two rotary rods, which at the locking operation are moved to a position intersecting one another and are locked by a split-pin or the like. This device, however, has the disadvantage that great force is required for rotating the rotary rods during the locking operation, and that apparently it is very difficult to insert the split-pin to its position at the same time. When the filter is to be detached, the split-pin is removed, whereby the rotary rods due to the clamping force tend to be returned with great force from their intersecting position to their resting position. This involves an unneglectible risk of damages on the hands and arms of the person handling the rotary rods. A reasonably safe handling of this known device, thus, requires two servicemen who are well familiar with the function of the locking device.

The present invention has the object to overcome the disadvantages of the conventional clamping devices and to produce a device, which can simply be controlled, is self-locking in clamped as well as in unclamped position, provides effective sealing against the filter housing and also is protective for the filter material and associated sealing material. This object is achieved by the device as defined in the attached claims.

Figure 2:
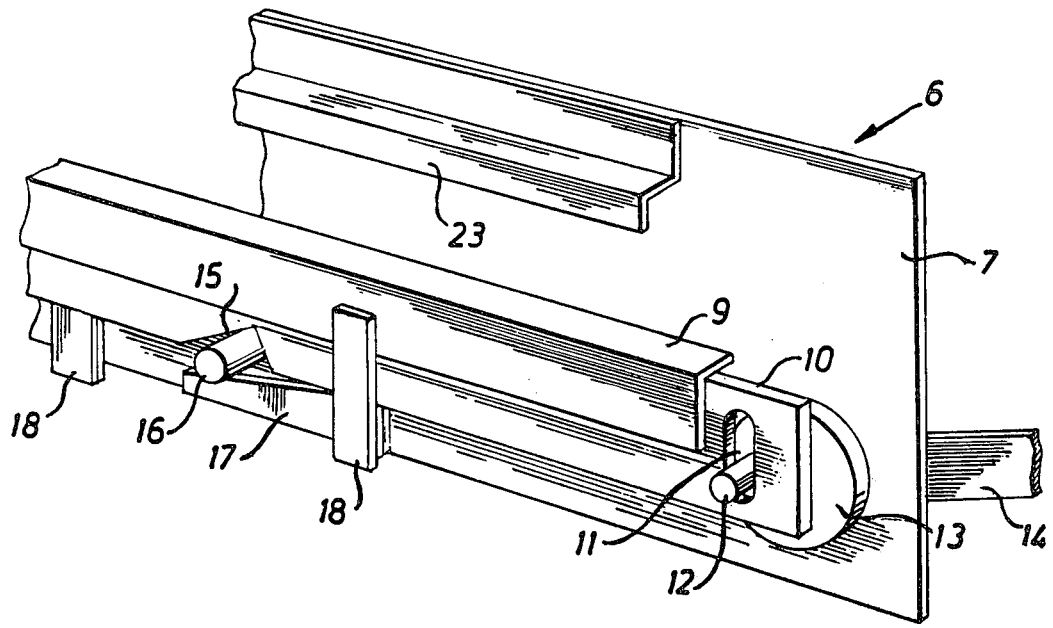
Figure 3:
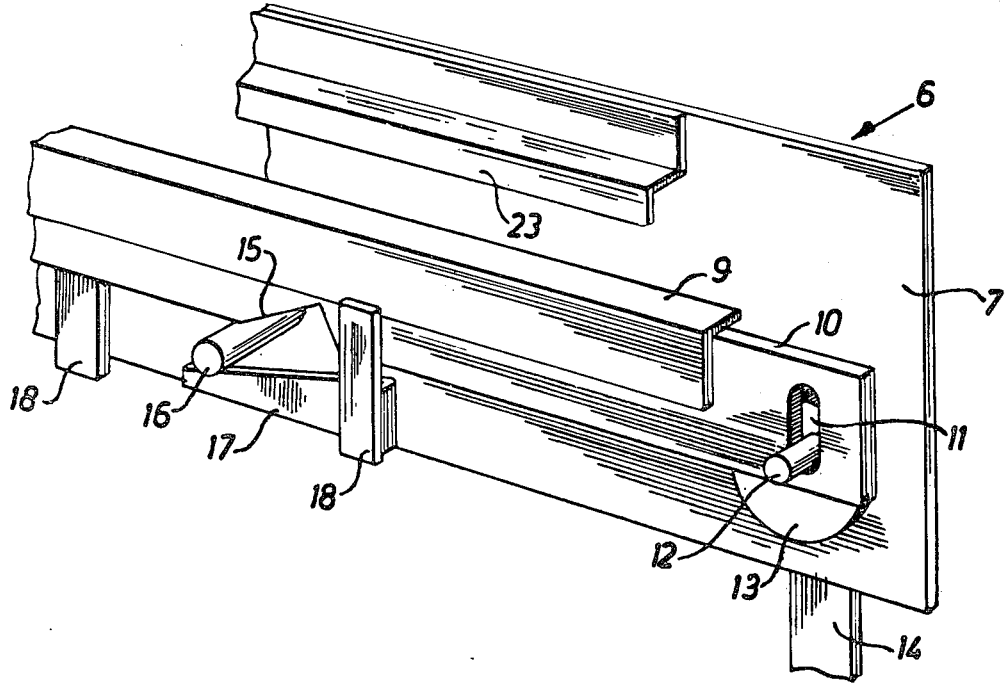
Figure 4:
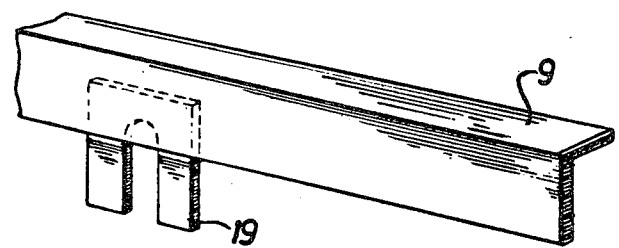
Figure 5:
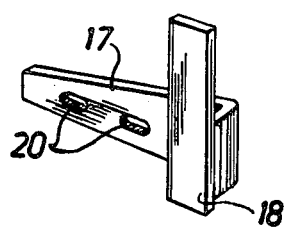
Figure 6:
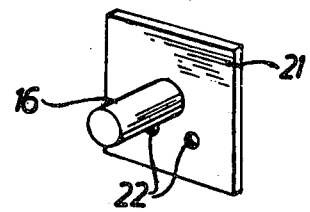
Figure 7:
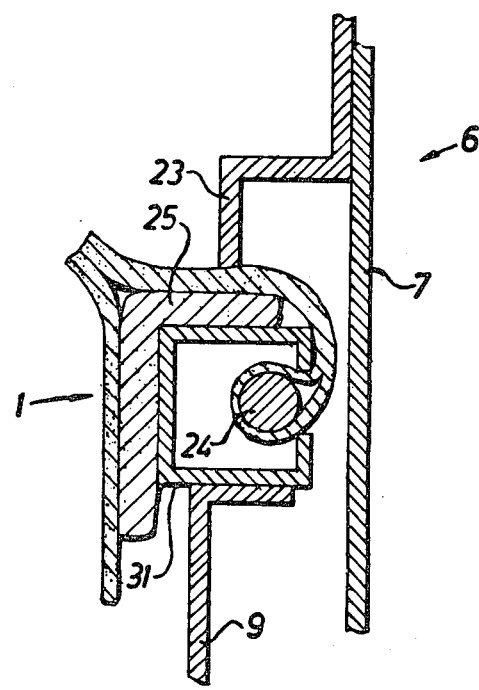

The invention is described in greater detail in the following, with reference to the accompanying drawings, in which FIG. 1 is a view of a filter clamped in a cassette frame, FIG. 2 is a view of the clamping members in unclamped position, FIG. 3 is a view of the clamping members in clamped position, FIG. 4 shows in detail a portion of the clamping members, FIG. 5 shows in detail another portion of the clamping members, FIG. 6 shows in detail still another portion of the clamping members, FIG. 7 is a section of the clamping members and of a portion of the cassette frame in clamped position in the filter housing, FIG. 8 shows the locking yoke in its entirety. FIG. 9 is a fragmentary perspective view showing the cassette frame in position within the filter housing.

In FIG. 1 the numeral 1 designates a filter, which comprises a plurality of filter bags 2 forming clean-gas passageways 3 for the cleaned gas. The passageways are closed at the lower portion 4 of the filter bags and form at their upper portion a common clean-gas opening 5. The filter is secured in a cassette frame 30 consisting of a rectangular frame 31, which comprises means for securing the filter in the cassette frame. The configuration cassette frame plus filter is intended to be introduced in a suitable way into a filter housing where the common clean-gas opening sealingly is connected to the clean-gas passageways of the filter housing. It is understood that one or more cassette frames with associated filters can be connected to the same filter housing. The numeral 50 designates means for stiffening the filter bags.

In FIG. 2 clamping members are shown in open position. At one side 7 of the filter housing 6 a connecting frame is attached, against which the cassette filter is to be connected sealingly. The cassette filter is intended to rest with one side on the bar 9, which in its turn rests on the flat-section rod 10. Said rod 10 is provided at its forward end with a vertical groove 11, through which a pin 12 is inserted. The pin is attached eccentrically on the cylindric axle 13 supported in the filter housing side 7. The axle is rotated by a locking rod 14, which is attached to said side and formed as a U-shaped yoke (FIG. 8). The flat-section rod 10 is provided with V-shaped recesses 15, in which support members are resting when the clamping device is in unclamped position. In the Figure only one recess is shown, but each flat-section rod is provided with at least two or more recesses, depending on the size and weight of the cassette filter. The support member 16 is of cylindric shape and rigidly attached to the filter housing. The numeral 17 designates a support element for the support member 16, which in greater detail is described below. The support shoulders 18 are provided for guiding the flat-section rod 10 and the bar 9.

In FIG. 3 the same details are shown as in FIG. 2, with the difference that the locking rod 14 here is turned to its lower position, whereby the clamping members are in clamped position.

FIG. 4 shows in detail a portion of the bar 9, which is provided with a guide yoke 19 straddling over the support member 16. The bar hereby is movable only in vertical direction.

FIG. 5 shows in detail the support element 17, which is provided with a previously mentioned support shoulder 18 and oval holes 20. The support element 17 serves as a holder and support for the support member 16 in FIG. 6, which support member is attached to a plate 21 provided with holes 22. The support member 16 and the support element 17 are secured in the filter housing 6 by screw connection for which purpose the filter housing side is provided with holes for screws and the support member. The support element 17 and the support member 16 can be displaced relative to one another due to the oval holes 20 and 22, whereby the position of the support member 16 in relation to the filter housing can be varied in vertical direction.

In FIG. 7, which is a section of the cassette frame 31 and filter housing 6, it is apparent how the cassette filter sealingly is clamped against the connecting frame 23 of the filter housing. Said connecting frame 23 is attached to the filter housing side 7. The filter 1 is clamped in the cassette frame 31 by clamping members 24. The filter material is provided with a sealing gasket 25. The bar 9 in clamped position presses the cassette frame 31 with associated filter 1 against the connecting frame 23.

FIG. 8 shows the locking rod 14 in its entirety. The rod is provided with two legs 26, which are interconnected by a control rod 27. The cylinder-shaped axles 13 are rigidly secured at each leg 26 and arranged to be supported in corresponding cylinder-shaped holes in the filter housing side 7. The pins 12 are attached eccentrically on the axle 13 in relation to its intended axis of rotation.

The operation of the invention is as follows. The cassette filter to be clamped in the filter housing is inserted into the same with the frame running on the bars 9. When the filter has been inserted entirely, the locking rod, which in starting position is directed upward, is moved downward, and thereby the flat section rod 10 is caused to move forward by the pin 12. During this movement the support member 16 slides out of the V-shaped recess 15, and thereby the flat-section rod is raised. The bar 9 hereby lifts the cassette frame vertically upward, whereby the filter with the sealing 25 is pressed against the connecting frame 23 of the filter housing. Hereby an effective sealing between the filter and filter housing is obtained. The locking rod after the completion of its locking movement is in downwardly directed position, while the support member 16 as shown in FIG. 3 has slid out of the recess 15. At this position, thus, the flat-section rod 10 rests with its horizontal lower edge against the support member 16. This position is fully stable, and at the same time the locking rod 14 is entirely unloaded. The clamping, thus, is entirely self-locking, and no additional locking of the locking rod is required. In practice, however, an unintended opening movement of the locking rod will be made impossible by applying a cover or door 28 (see FIG. 9) to the opening in the filter housing 29 where the cassette filter is introduced. Due to the fact that the movement of the bar 9 at the clamping of the cassette filter is entirely vertical, the filter gasket 25 will not get worn even at a great number of clampings in the filter.

Hereby the sealing of the filter against the filter housing can be ensured. The invention further offers the possibility of adjusting the clamping force in a simple manner thereby, that the support member 16 and support element 17 are secured in the filter housing by screw connection, so that the height position of the support member 16 easily can be adjusted.

When the cassette filter is to be removed from the filter housing, the locking rod 14 is moved upward to the position shown in FIG. 2. The flat-section rod 10 thereby is lowered with the support member 16 in its recess 15. This position, too, is stable, and the locking rod now also is unloaded.

The invention, thus, provides an efficient clamping of the cassette filter in the filter housing, which clamping also is protective for the filter material. The clamping can be carried out in a simple way without complicated operations by one man and does not require much force. The locking rod being unloaded in both clamped and unclamped position, there is less risk of accidents in connection with filter exchange and inspection.

I claim:

1. A device for clamping a cassette filter in a filter housing, cassette filter comprising a cassette frame having a clean-gas opening with associated filter cells, and said filter housing is provided with a connecting frame and clamping members to clamp the clean-gas opening of the cassette filter sealingly against the connecting frame, the clamping members comprising a U-shaped locking rod with two legs having their ends pivotally supported in the filter housing and pins arranged eccentrically in relation to the pivotal axis and projecting toward each other, a flat-section rod disposed along each side of the filter housing and provided on its lower surface with at least two V-shaped recesses and at its forward end a vertical groove receiving one of said pins, support members attached to the filter housing for supporting said rod, a bar fixed in the horizontal direction and movable in the vertical direction on the flat-section rod to support one side of the cassette filter, the flat-section rod in the unclamped position of the cassette filter resting with the support members in the V-shaped recess and at the same time disposing the legs of the locking rod substantially upward, and upon clamping the cassette filter in the filter housing, movement of the legs of the locking rod in a downwardly directed pivoted movement about its pivotal axis cause the pins to transfer horizontal movement to the flat-section rod so that the support members slide out of the V-shaped recesses, thereby causing the flat-section rod to perform a vertical upwardly directed movement, which is transferred to the bar, whereby said bar lifts the cassette filter and presses the same sealingly against the connecting frame of the filter housing.

2. A device according to claim 1, characterized in that the support members are vertically adjustable in the filter housing.

* * * * *